United States Patent [19]
Griffin et al.

[11] Patent Number: 5,307,086
[45] Date of Patent: Apr. 26, 1994

[54] METHOD OF IMPLEMENTING A PREVIEW WINDOW IN AN OBJECT ORIENTED PROGRAMMING SYSTEM

[75] Inventors: David L. Griffin, Keller; Patrick J. Keane, Grapevine, both of Tex.

[73] Assignee: International Business Machines Corporation, Armonk, N.Y.

[21] Appl. No.: 772,801

[22] Filed: Oct. 8, 1991

[51] Int. Cl.⁵ ............................................. G09G 5/14
[52] U.S. Cl. ................................. 345/146; 345/116; 395/155
[58] Field of Search ............... 340/706, 709, 710, 711, 340/712, 721, 723, 734; 395/148, 155, 157, 159, 161; 345/115, 116, 145, 146

[56] References Cited

U.S. PATENT DOCUMENTS

| | | | |
|---|---|---|---|
| Re. 32,633 | 3/1988 | Hovey et al. | 340/710 |
| 4,464,652 | 8/1984 | Lapson et al. | 340/710 |
| 4,587,520 | 5/1986 | Astle | 340/710 X |
| 4,591,840 | 1/1986 | Curtis et al. | 340/706 |
| 4,772,882 | 9/1988 | Mical | 340/712 X |
| 4,896,291 | 1/1990 | Gest et al. | 340/703 X |
| 5,165,012 | 11/1992 | Crandall et al. | 340/706 |

*Primary Examiner*—Jeffery Brier
*Attorney, Agent, or Firm*—Jonathan E. Jobe, Jr.

[57] ABSTRACT

A method of implementing a preview window in an object oriented programming system that includes an application having at least a first panel and a second panel that are selectively displayable on a display screen. The second panel displays underlying information and the first panel displays an abbreviated representation of the underlying information. The user can temporarily display a preview window that contains underlying information while viewing the first panel.

5 Claims, 3 Drawing Sheets

METHOD OF IMPLEMENTING A PREVIEW WINDOW IN AN OBJECT ORIENTED PROGRAMMING SYSTEM

BACKGROUND OF THE INVENTION

1. Field of the Invention

The present invention relates generally to object oriented computer programming systems and more particularly to a method of implementing a preview window in an object oriented programming system, whereby a user may view underlying information in an application that includes at least a first panel and second panel selectively displayable on a computer display screen in which the second panel displays underlying information and the first panel displays an abbreviated or graphical representation of the underlying information, while the first panel is displayed.

2. DESCRIPTION OF THE PRIOR ART

Many computer application programs have multiple panels or views that display the same information in various levels of detail or granularity. For example, an electronic mail application typically has one or more "in-basket" panels that list the items received and one or more mail panels that contain the items themselves. The in-basket panel typically has fields for at least the identity of the sender and subject for each item of mail. The contents of the fields in the in-basket are taken from the mail items, and, because of space limitations, the contents are often truncated or abbreviated.

In another example, typical electronic calendar systems include daily panels or views and monthly panels or views. Presently, these systems allow the user to open the daily view to work with and view events of the day. For example, a typical daily view includes an entry area into which the user can enter event starting and stopping times and a description of the event. The monthly view displays a normal grid style calendar that includes a cell for each day. Whenever an event is scheduled on the daily panel, a graphical representation of the event is displayed on the monthly view. The graphical representation, which is known in the art as a "busy bar", allows the user to tell at a glance of the monthly view when the user is busy.

Presently, if the user desires to know what event or events are represented by a busy bar, the user must replace the monthly view with the appropriate daily view and then read through the events. In presently existing electronic calendars, the user typically cannot view both the daily panel and the monthly panel simultaneously. Thus, in order to review the month's events, the user must go back and forth between the monthly panel and the daily panel, which requires considerable user input and time in repainting the display screen. Moreover, the user must continually change focus between the daily panel and the monthly panel, which causes the user to have to re-establish his orientation each time he returns to the monthly panel.

SUMMARY OF THE INVENTION

In the present invention, a method is provided that allows the user to temporarily display a preview window with underlying information without displaying the panel that contains the underlying information. More specifically, the present invention provides a method of viewing underlying information in an application that includes at least a first panel and a second panel that are separately and not simultaneously displayable on a computer system display screen. The second panel contains and is adapted to display underlying information, and the first panel contains and is adapted to display an abbreviated, truncated or graphical representation of the underlying information.

In the present invention, the first panel is displayed on the display screen. When the user points to the abbreviated representation while operating a user operable selection device, a preview window is opened on the display screen, while the system continues to display the first panel, and the underlying information is displayed in the preview window. In the preferred embodiment of the invention, the user uses a mouse to point to the abbreviated representation and the user operable selection device comprises one of the mouse buttons, which in the preferred embodiment is mouse button number two. As long as mouse button number two remains pressed, the preview window with the underlying information displayed therein remains displayed. The system ignores all further user mouse inputs until the mouse button is released. When the mouse button is released, the preview window is closed or hidden.

While the preview window is displayed, the user's focus remains on the first panel. Thus, when the user closes the preview window, he is still in the first panel, and, therefore, he does not need to regain his bearings. If the user is curious about what information is represented by another abbreviated representation, he may look at it by pointing to the other abbreviated representation and pressing the appropriate mouse button. The user does not need to execute the various actions necessary to close the first panel, display the second panel, and, after having viewed the second panel, close the second panel and re-display the first panel. Moreover, the user does not need to wait for the system to redraw the various panels. In the present invention, the user can simply take a look at whatever underlying data he wants to and dismiss the data whenever he is through.

In another aspect of the invention, a method is provided that enables a user or programmer to modify or extend an application in an object oriented programming system to provide preview windows. According to the invention, the user or programmer extends the SubPane and ApplicationWindow subclasses of the Window class. A new subclass aPane is created by extending SubPane to respond to a user input message, which in the preferred embodiment is button2Down. When aPane receives the button2Down: message, it converts the point at which button2Down occurred into anObject, which the application understands, and sends a preview message, whose argument is anObject, to the ApplicationWindow extension. If anObject is not nil, aPane captures all further mouse input until the termination action, i.e. button2Up: is received. When button2Up: is received, the mouse input capture is cleared and anObject is set to nil. In the extension to the ApplicationWindow subclass, a new subclass, anApplication, is created by building a preview window that is initially invisible or hidden. The anApplication object is adapted to receive from aPane. When anApplication receives a preview: message from aPane, if the argument, anObject, is not nil, the preview window is updated and then unhidden so that the user can see the underlying information. If the argument of the preview: anObject message nil, the preview window is or remains hidden.

DESCRIPTION OF THE PREFERRED EMBODIMENT

Figure 1:
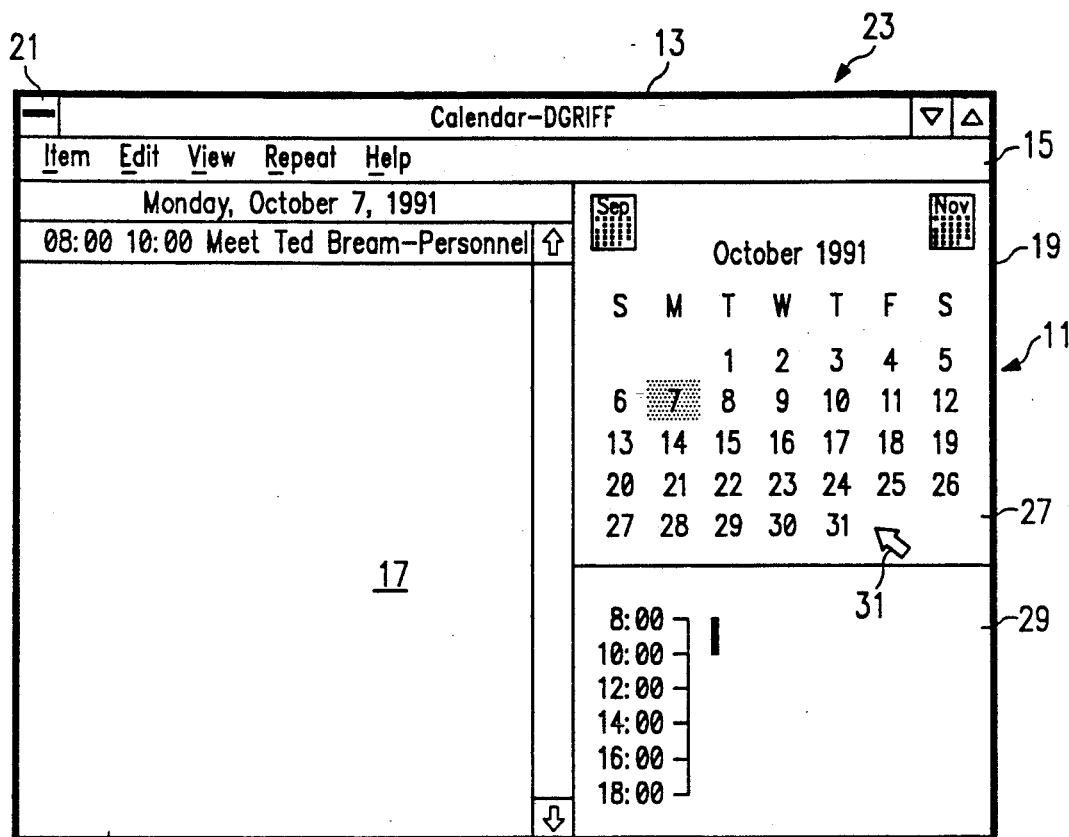
FIG. 1 is a pictorial view of a daily panel of an electronic calendar application.

Referring now to the drawings, and first to FIG. 1, a window is designated generally by the numeral 11. Window 11 is displayed on a computer system display screen (not shown) in a manner well known to those skilled in the art. Window 11 includes a title bar 13, an action bar 15, and a client area 17. Title bar 13, action bar 15, and client area 17 are contained in a window border 19.

Title bar 13 includes the name of the window, which in the drawings is an electronic calendar application. Title bar 13 also includes a system menu icon 21, and window sizing icons, which are designated generally by the numeral 23. System menu icon 21 can be activated to display a pull-down menu with a list of actions that can be performed on the window. Sizing icons 23 provide a fast means by which the user can maximize or minimize window 11.

Action bar 15 contains a list of actions that can be performed on or by the application displayed in the window. Each item in the list of action bar 15 can be activated to display a pull-down menu of specific actions.

Figure 2:
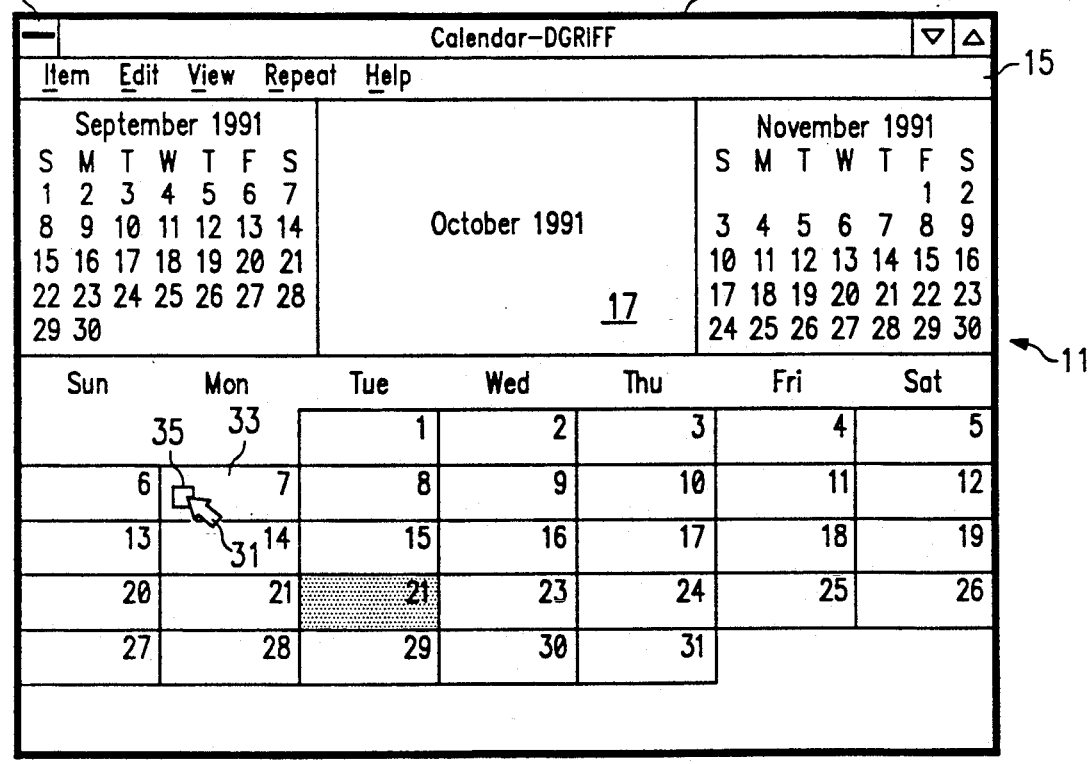
FIG. 2 is a pictorial view of a monthly panel of the electronic calendar application of FIG. 1.

Client area 17 of FIG. 1 contains a daily panel of an electronic calendar application. The electronic calendar application is illustrative of a class of applications that include multiple, separately and not simultaneously displayable, screens or panels having various degrees of detail for the same information. The electronic calendar application includes a daily panel for each day and a monthly panel for each month, as illustrated in FIG. 2. The daily panel comprises three panes, including a text entry pane 25, a calendar pane 27, and a graphical busy bar pane 29. Calendar pane 27 provides a quick view of the current month while the user is in the daily panel and busy bar pane 29 provides the user with a quick view of the times that are occupied and alerts the user to any time conflicts or overlaps. Text entry panel 25 contains the detailed calendar information for the electronic calendar of the present invention. The user can enter calendar events with the keyboard and view the events in the text entry pane 25.

A pointer 31 is displayed in calendar pane 27 of FIG. 1. Pointer 31 is moveable by means of a mouse (not shown) in a manner well know to those skilled in the art. The user can move pointer 31 about the screen and invoke actions from action bar 15 or title bar 13. Also, when pointer 31 enters text entry pane 25, its appearance and function changes to a typing cursor.

Referring now to FIG. 2, window 11 is shown displaying a monthly panel view of the electronic calendar of the present invention. Client area 17 of the window of FIG. 2 includes a display that looks like a normal office calendar. The display includes an array of calendar cells, including a cell 33 for Oct. 7, 1991. The monthly panel of FIG. 2 gives the user a quick overview of the month in the same way that one gets an overview of a month from a normal paper calendar. Events are symbolized on the monthly panel by graphic representations or "busy bars" or boxes, including box 35 in cell 33. Box 35 indicates that an event is scheduled early in the day on October 7, but it does not provide any detail about the event. In the past, if the user wanted to see what box 35 represented, he could either select cell 33 by clicking mouse button number 1 while pointing to cell 33 with pointer 31 and then pulling down a menu from the "VIEW" action in action bar 15 and selecting the daily view, or by "double-clicking" on cell 33. In response to either of the foregoing actions, the system removed the monthly view and replaced it with the daily view for Oct. 7, 1991. Then, the user could read in text entry pane 25 that the box 35 symbolizes an 8:00 a.m. to 10.00 a.m. meeting. When the user wanted to return to the monthly panel, he used the pull-down menu from the "VIEW" action and selected the monthly view.

Figure 3:
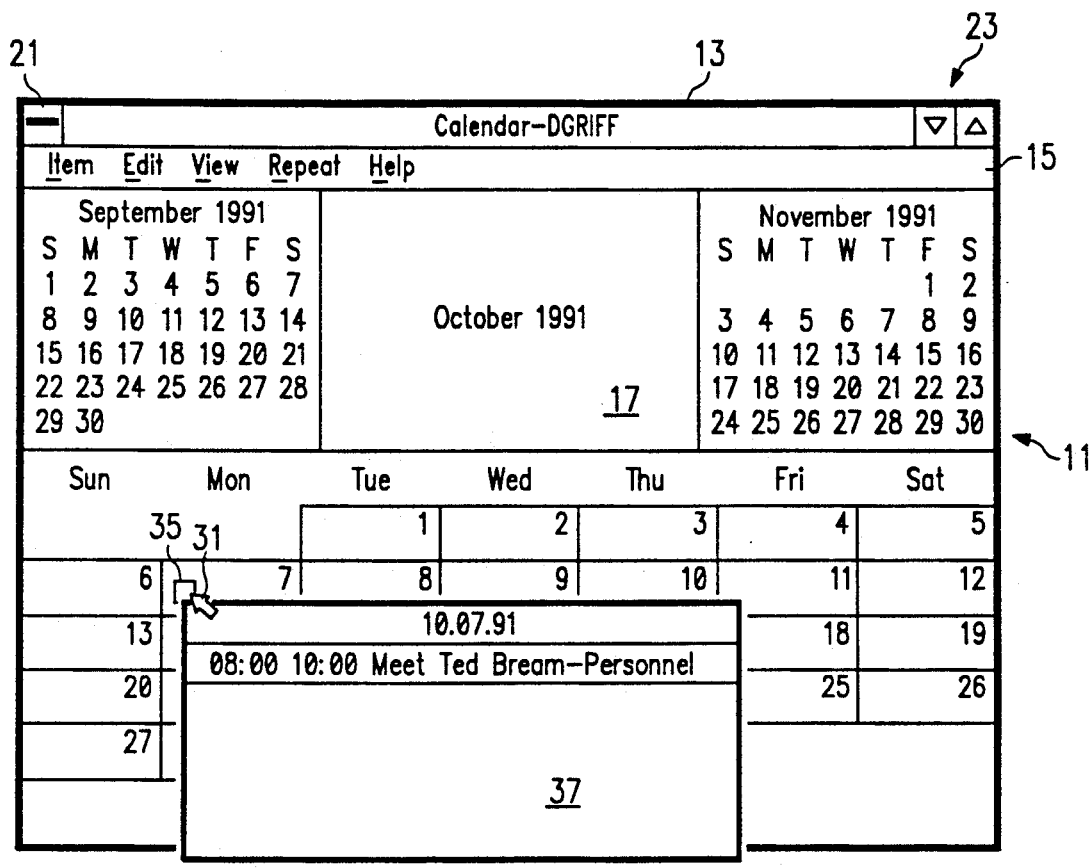
FIG. 3 is a pictorial view of the monthly panel of FIG. 2 with a preview window according to the present invention displayed thereon.

Referring now to FIG. 3, window 11 is shown displaying the monthly panel view of FIG. 2 with a preview or quick event view window 37. As will be explained in detail hereinafter, preview window 37 is displayed by pointing to box 35 with pointer 31 and pressing mouse button number two. Preview window 37 displays the textual information from text entry pane 25 of FIG. 1 without having to display the daily panel. In the preferred embodiment, preview window 37 is displayed as long as mouse button number two remains pressed. When mouse button number two is released, preview number 37 is closed or hidden and the screen returns to the appearance of FIG. 2.

Figure 4:
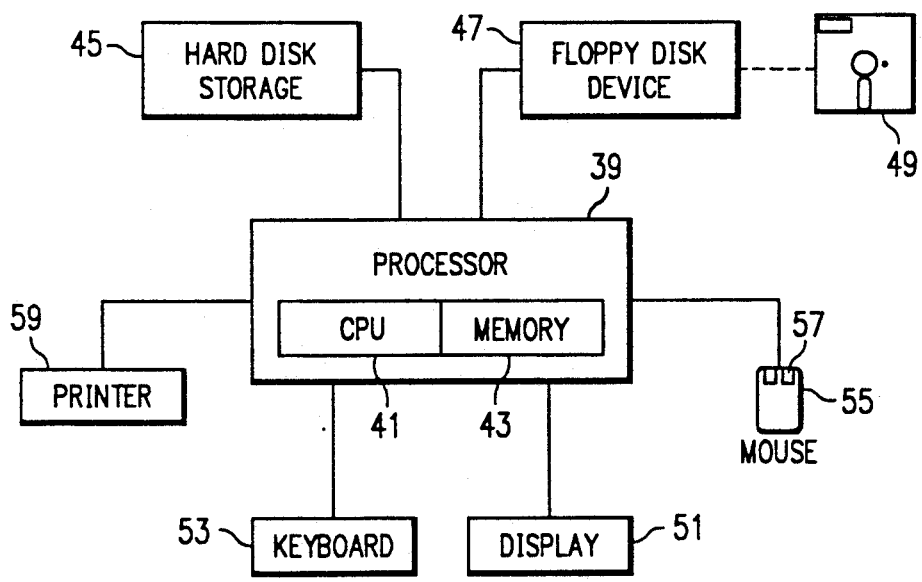
FIG. 4 is a block diagram of a system according to the present invention.

Referring now to FIG. 4, there is shown a block diagram of a system according to the present invention. The system includes a processor 39, which includes a central processing unit (CPU) 41 and random access memory 43. The system also includes additional memory in the form of a hard disk storage device 45, a floppy disk device 47, or, preferably both. Floppy disk device 47 is adapted to receive a diskette 49 that has recorded thereon the software implementation of the present invention.

The system of FIG. 4 includes user interface hardware, including a display 51, a keyboard 53, and a mouse 55. In the preferred embodiment, mouse 55 includes two buttons, including a mouse button number two 57. The system may, optionally, include a printer 59.

Figure 5:
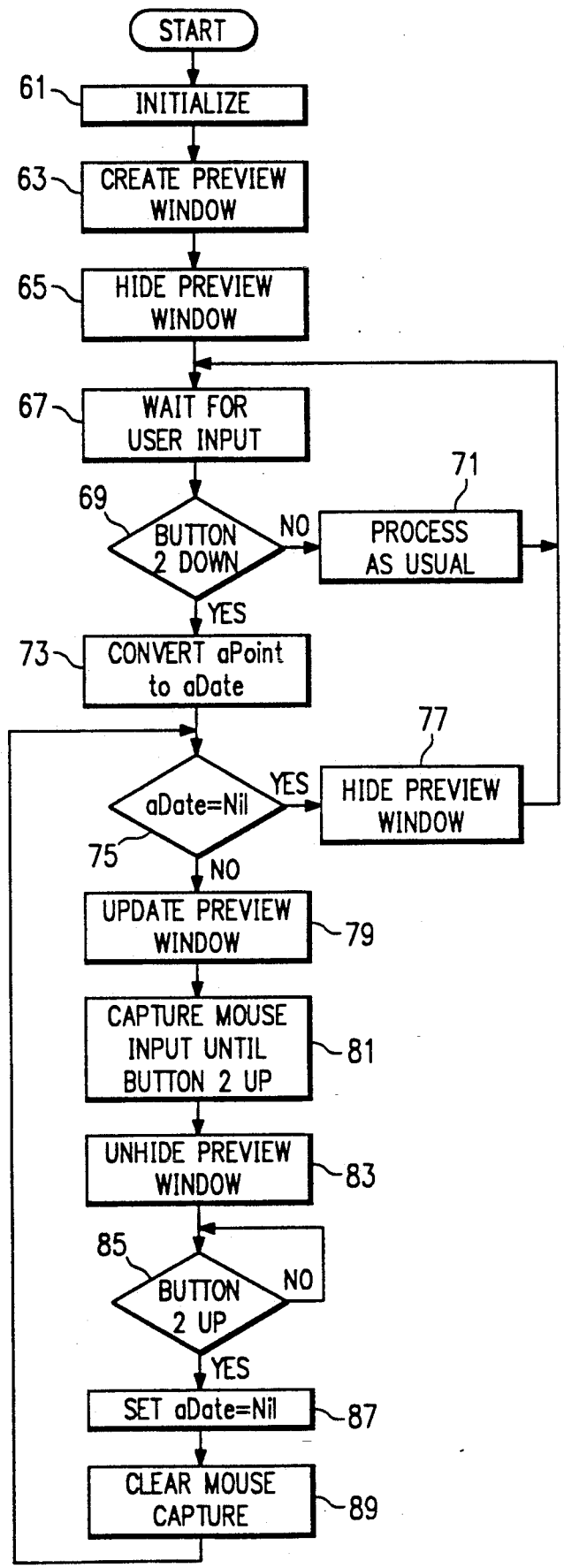
FIG. 5 is a flow chart of a preferred software implementation of the present invention.

Referring now to FIG. 5, there is shown a flow chart that illustrates the logic of the software implementation of the present invention. First, the system is initialized at block 61. The initialization includes loading and starting the electronic calendar application. Then a normally hidden preview window is created at block 63 and hidden at block 65. The preview window is normally hidden in the sense that it is displayed only temporarily in response to a specific user input. After the preview window has been created and hidden, the system waits for user input at block 67. When the system receives a user input, it tests at decision block 69 whether or not the user input is mouse button number two down. If the input is anything other than mouse button number two down, the system processes the input as usual, as indicated generally at block 71, and returns to block 67 to continue waiting for user input. If, on the other hand, the user input is mouse button number two down, then the system, at block 73, converts the point on the screen where the pointer was located when mouse button 2 was pressed (aPoint to aDate. In the embodiment disclosed, aDate is nil whenever aPoint is not in one of the graphical representations, such as box 35 of FIGS. 2 and 3. The system then tests, at decision block 75, whether or not aDate is nil; if it is, the preview window is or, if it is already hidden, remains hidden at block 77 and the system returns to block 67 and continues to wait for user input. If, on the other hand, aDate is not nil, the system at block 79 updates the preview window by fetching the underlying information that would appear in text entry pane 25 of the daily panel of FIG. 1. After the preview window has been updated at block 79, the system captures all future user input from the mouse other than button2up at block 81, and the system ignores them. The future mouse messages are captured for the sake of stability so that the system does not jump around gathering and then displaying other underlying data. Then, at block 83, the system unhides the preview window. After the preview window has been unhidden, the system tests at decision block 85 whether or not mouse button number two is up. As long as mouse button number two remains down (not up at decision block 85) the preview window remains unhidden. However, when mouse button number two is released, aDate is set to nil at block 87 and the capture of mouse messages is cleared at block 89. Then the system returns to decision block 75 to test whether or not aDate is nil. Since it is, the system hides the preview window at block 77, and returns to block 67 to wait for another user input.

In the preferred embodiment, the invention is adapted to run in an operating environment that provides a graphical user interface with screen management facilities, such as OS/2 Presentation Manager (Trademarks of IBM Corporation). Preferably, the invention is implemented in an object oriented programming system, such as Smalltalk/V PM (Smalltalk/V is a trademark of Digitalk Inc.).

The present invention allows a programmer or user to modify or extend an object oriented application having multiple panels with different expressions of common data. In object oriented programming systems, objects are encapsulated structures consisting of instructions, which are called methods, and data. Objects send messages to and receive messages from other objects. When an object receives a message, its methods determine what it will do. The receiving object may respond to a message by sending a message to another object or to itself.

An object is created when a message requesting its creation is received by a parent class. A new object takes on or inherits its data and methods from its parent class. A new object also has other methods or data that distinguish it from other members of its class. Object oriented programming consists mainly of creating objects and making them behave consistently. When an object oriented program is running, objects are created as they are needed, messages are passed among the objects, and objects are deleted when they are no longer needed.

In the calendar embodiment discussed above, the invention is implemented by adding extensions to the SubPane and ApplicationWindow subclasses of the Window class in the Smalltalk/V PM environment. The actual extensions, written in Smalltalk/V PM language are set forth below:

```
a. CalendarApplicationWindow extensions:
createPreviewWindow
        "Private - Create the previewWindow and hide it."
        previewWindow :=
            (PreviewWindow new addSubpane:
                ( previewDataPane := (ColumnarPane openOn: self viewer)
                    owner: self;
                    fieldSelectors: #(beginTimeAsString endTimeAsString
                                    firstTextLine);
                    framingBlock: [ :box | box ] ) ).
        previewWindow open _
openMonthlyPanes
        "Private - Create the panes for the monthly view of self."
        self openMonthlyViewer.
        "Overall group for window hiding and blank space clearing"
        self addSubpane: (self monthlyPane: (GenericPane new
                        hidden: true;
                        owner: self) ).
        "Month display area at the bottom"
        thisMonthPane := (CalendarPaneWithBusyBars openOn: self monthlyViewer)
                    owner: self;
                    when: #performDefaultAction    perform: #displayDaySelected
                    when: #select                  perform: #selectDay:;
                    when: #preview                 perform: #preview:;
                    framingBlock: [ :box | box leftBottom
                                    rightTop: (box rightTop down: 100)]
        self monthlyPane addSubpane: thisMonthPane
preview: aPane
        "Private - Update the preview window to reflect the user action."
        aPane previewDay notNil
            ifTrue: [ self showPreviewWindowFor: aPane previewDay]
            ifFalse: [ self hidePreviewWindow ]
closePreviewWindow
        "Private - Close the preview window."
        previewWindow close
showPreviewWindowFor: aDate
        "Private - Update the preview window to reflect the user action."
        self previewFilterBlockForDay: aDate.
        previewWindow label: aDate formPrint.
```

-continued

```
    previewWindow showInRectangle: self previewRectangle
hidePreviewWindow
    "Private - Hide the preview window."
    previewWindow hide
b. CalendarPane extensions:
button2Down: aPoint
    "Private - Button 2 has been pressed down. If aPoint is over one
    of the day rectangles, inform the owner of the user request to
    preview the day's events."
    | aDate |
    aDate := self dateFromPoint: aPoint.
    aDate notNil
    ifTrue:
        [ self captureMouseInput.
            self previewDay: aDate]
previewDay: aDate
    "Private - Set the day which the user has requested a preview of.
    if none, this will be nil. Then notify the application."
    previewDay := aDate.
    self event: #preview
button2Up: aPoint
    "Private - Complete the mouse button 2 action by releasing the
    mouse and informing the owning application the the preview request
    has ended."
    self isMouseCaptured
    ifTrue:
        [ self clearMouseCapture.
            self previewDay: nil]
```

From the foregoing, it may be seen that the CalendarPane is extended by the addition of the method button2Down. Upon receipt of the button2Down: message, CalendarPane converts the point at which the event occurred into aDate that the calendar application understands and sends a message to the CalendarApplicationWindow object to preview aDate. If aDate is not nil, CalendarPane captures all mouse input until the termination action, i.e., button2Up, is received. When button2Up: is received, the mouse input capture is cleared and aDate is set to nil.

In the extensions to the CalendarApplicationWindow object, a preview window is built that is initially invisible or hidden. The calendar window application extension is adapted to receive messages from the CalendarPane object. When it receives a preview message from the CalendarPane object, if the argument of the message is nil, the preview window is or remains hidden. If, on the other hand, the argument is not nil, then the preview window is updated and then unhidden so that the user can see the information.

In general, the invention provides a method that enables a user or programmer to modify or extend an application in an object oriented programming system to provide preview window or to create a new application that includes preview windows. According to the invention, the user or programmer extends the SubPane and ApplicationWindow subclasses of the Window class. A new subclass aPane is created by extending SubPane to respond to a user input message, which in the preferred embodiment is button2Down:. When aPane receives the button2Down: message, it converts the point at which button2Down occurred (aPoint) into an object, which the application understands, and sends a preview message, whose argument is anObject, to the ApplicationWindow extension. If anObject is not nil, aPane captures all further mouse input until the termination action, i.e. button2Up: is received. When button2Up: is received, the mouse input capture is cleared and an object is set to nil. In the extension to the ApplicationWindow subclass, a new subclass, anApplication, is created by building a preview window that is initially invisible or hidden. The anApplication object is adapted to receive messages from aPane. When anApplication receives a preview: anObject message from aPane, if the argument, anObject, is not nil, the preview window is updated and then unhidden so that the user can see the underlying information. If the argument of the preview: anObject message nil, the preview window is or remains hidden.

While the invention has been particularly shown and described with reference to a preferred embodiment, those skilled in the art will understand that various changes may be made in form and detail without departing from the spirit and scope of the invention.

What is claimed is:

1. In a computer system including a display screen, a user operable pointing device and a user operable selection device, a method of viewing underlying information in an application including at least a first panel and a second panel, each of said panels being selectively separately displayable on said screen, said second panel displaying said underlying information and said first panel displaying an abbreviated representation of said underlying information, which comprises the steps of:
    displaying said first panel on said display screen;
    opening a preview window on said display screen, while continuing to display said first panel, in response to operating said user operable selection device; and,
    displaying said underlying information from said second panel in said preview window.

2. The method as claimed in claim 1, wherein:
    said user operable pointing device includes a mouse; and said user operable selection device includes a mouse button, and said step of operating said user operable selection device includes the step of pressing said mouse button.

3. The method as claimed in claim 2, including the step of:
    closing said preview window in response to releasing said mouse button.

4. The method as claimed in claim 2, including the step of:
    maintaining said preview window open with said underlying information displayed therein until said mouse button is released.

5. The method as claimed in claim 2, including the step of:
    ignoring all user inputs until said mouse button is released.

* * * * *